United States Patent [19]

Koch

[11] Patent Number: 5,297,171
[45] Date of Patent: Mar. 22, 1994

[54] RECEIVER COMPRISING AT LEAST TWO RECEIVE BRANCHES

[75] Inventor: Wolfgang Koch, Heroldsberg, Fed. Rep. of Germany

[73] Assignee: U.S. Philips Corporation, New York, N.Y.

[21] Appl. No.: 804,151

[22] Filed: Dec. 6, 1991

[30] Foreign Application Priority Data

Dec. 8, 1990 [DE] Fed. Rep. of Germany ....... 4039245

[51] Int. Cl.[5] .............................................. H04B 7/10
[52] U.S. Cl. ..................................... 375/100; 375/102; 375/96; 455/278.1
[58] Field of Search .................. 375/38, 40, 75, 94, 375/96, 100, 102; 455/132, 137, 272, 273, 278.1

[56] References Cited

U.S. PATENT DOCUMENTS

| | | | |
|---|---|---|---|
| 5,031,193 | 7/1991 | Atkinson et al. | 375/100 |
| 5,127,025 | 6/1992 | Okanoue | 375/100 |
| 5,179,575 | 1/1993 | Pierce, deceased et al. | 375/100 |

FOREIGN PATENT DOCUMENTS 4001592 10/1989 Fed. Rep. of Germany .
4018044 6/1990 Fed. Rep. of Germany .
0611304 6/1978 U.S.S.R. ............................ 455/278.1

OTHER PUBLICATIONS

Correleavtive and Iterative Channel-Estimation in Adaptive Viterbi Equaliserz for TDMS Mobile Radio, Fachberichten No. 109, VDE Verlag. pp. 363-368.

*Primary Examiner*—Curtis Kuntz
*Assistant Examiner*—Don N. Vo
*Attorney, Agent, or Firm*—David R. Treacy

[57] ABSTRACT

A diversity receiver having at least two receive branches, and only one equalizer. Each receive branch includes a matched filter and circuits for forming an autocorrelation function for each estimated impulse response of the individual receive branches. A first adder circuit adds the output signals, weighted with weighting factors of the matched filters to form a first sum. A second adder circuit add the autocorrelation functions weighted with weighting factors to form a second sum. The weight factors are approximately inversely proportional to the instaneous noise power in each receive a branch. An equalizer evaluates the two sums.

14 Claims, 3 Drawing Sheets

RECEIVER COMPRISING AT LEAST TWO RECEIVE BRANCHES

BACKGROUND OF THE INVENTION

The invention relates to a receiver comprising at least two receive branches and including a combining arrangement for combining the receive branches.

Receivers comprising at least two receive branches, in which either one of the two receive branches receives signals with the same signal content, are denoted diversity receivers and can be used, for example, in mobile radio systems. In so-called space-diversity systems the aerials of the individual receive branches are spatially arranged several wavelengths apart. In so-called frequency-diversity systems the signals are transmitted and received at various frequencies. Due to the different transmission characteristics for each transmit path or each frequency, the signals are received with different qualities in the individual receive branches. By accordingly processing the signals received in the individual receive branches it is possible to obtain an input signal which, for example with respect to the signal-to-noise ratio, has better properties than the individual received signals.

German Patent Application P 40 18 044.1 (date of filing Jun. 6, 1990) describes a receiver with at least two receive branches for receiving a transmitted data sequence. Each receive branch comprises an equalizer. The equalizers are arranged in such a way that they not only detect the received data but also produce a reliability information signal for each detected data symbol. The equalizers are based on the so-called Viterbi method. The equalization is effected separately in each branch so that this requires relatively high manufacturing costs.

SUMMARY OF THE INVENTION

It is an object of the invention to provide a receiver of the type mentioned in the opening paragraph in which separate equalization in each receive branch is avoided.

This object is achieved with a receiver of the type mentioned in the opening paragraph in that each receive branch comprises a matched filter and an arrangement for forming the appropriate autocorrelation function for the estimated impulse response of the individual receive branches, in that the receiver comprises a first adder circuit for adding together the matched filter output signals which have been weighted with weight factors to form a first sum and a second adder circuit for adding together the receive branch autocorrelation functions weighted with the weight factors to form a second sum and includes an equalizer evaluating the first and second sums, the weight factors being approximately inversely proportional to an instantaneous noise power in each receive branch.

The formation of the first and second sums in the manner described above and the evaluation of these sums by the equalizer maximizes the maximum ratio combining of the received signal. The actual equalization is effected by means of only a single equalizer. This considerably reduces the manufacturing costs compared with a receiver comprising an equalizer arranged in each branch, but yet the quality requirements, for example, as to the future European mobile radio system, can be met.

Metrics for only a single equalizer especially based on the Viterbi method can be obtained, in that the equalizer comprises an evaluation arrangement for evaluating the first and second sums, while metrics for the equalizer which is specifically based on the Viterbi method can be produced from the first and second sums in the evaluation arrangement.

In transmission systems which may change with time, such as, for example, mobile radio systems, the transmission quality is considerably improved in that in at least one receive branch the combining arrangement comprises matching means for matching the estimated impulse response at predeterminable intervals to the transmission requirements. If the estimated impulse response is matched in only one receive branch, this will lead to a further reduction of the manufacturing costs.

A cost reduction without appreciable loss of quality is obtained in that the matching means match an estimated impulse response only in the receive branch that has the larger estimated maximum ratio combining. This makes it possible in a receiver for the GSM system to perform the so-called maximum ratio combining, for example, for two receive branches in only one signal processor, whereas two signal processors of the same type used to be necessary for solutions known so far.

An equalization by means of the Viterbi equalizer only after two receive branches have been combined is effected in that the metrics are formed in accordance with the following equation:

$$\lambda(S_{n-1}, S_n) = -Re\left\{ c_n\left( Y_n - \sum_{l=1}^{L} c_{n-l}\, p_l \right) \right\},$$

with $c_n = 1 - 2b_n$ where the bits $b_{n-1} \ldots b_n$ denote the transistion of a state $S_{n-1}$ to a state $S_n$, $Y_n$ denotes the first sum and $p_l$ denotes the second sum, n denotes a sampling instant and l denotes a finite number of previous bits. In this manner the cost of implementation is considerably reduced.

Distortions may be compensated for in that the transmitted data sequence comprises a training data sequence from which the impulse response of the radio transmission link in each receive branch is individually estimated with the aid of a comparison data sequence stored in the receiver. With the aid of the estimated impulse response the radio transmission link is copied in the best way possible.

The invention will be further explained hereinbelow with reference to the exemplary embodiments shown in the drawing.

DESCRIPTION OF THE PREFERRED EMBODIMENT

Figure 1:
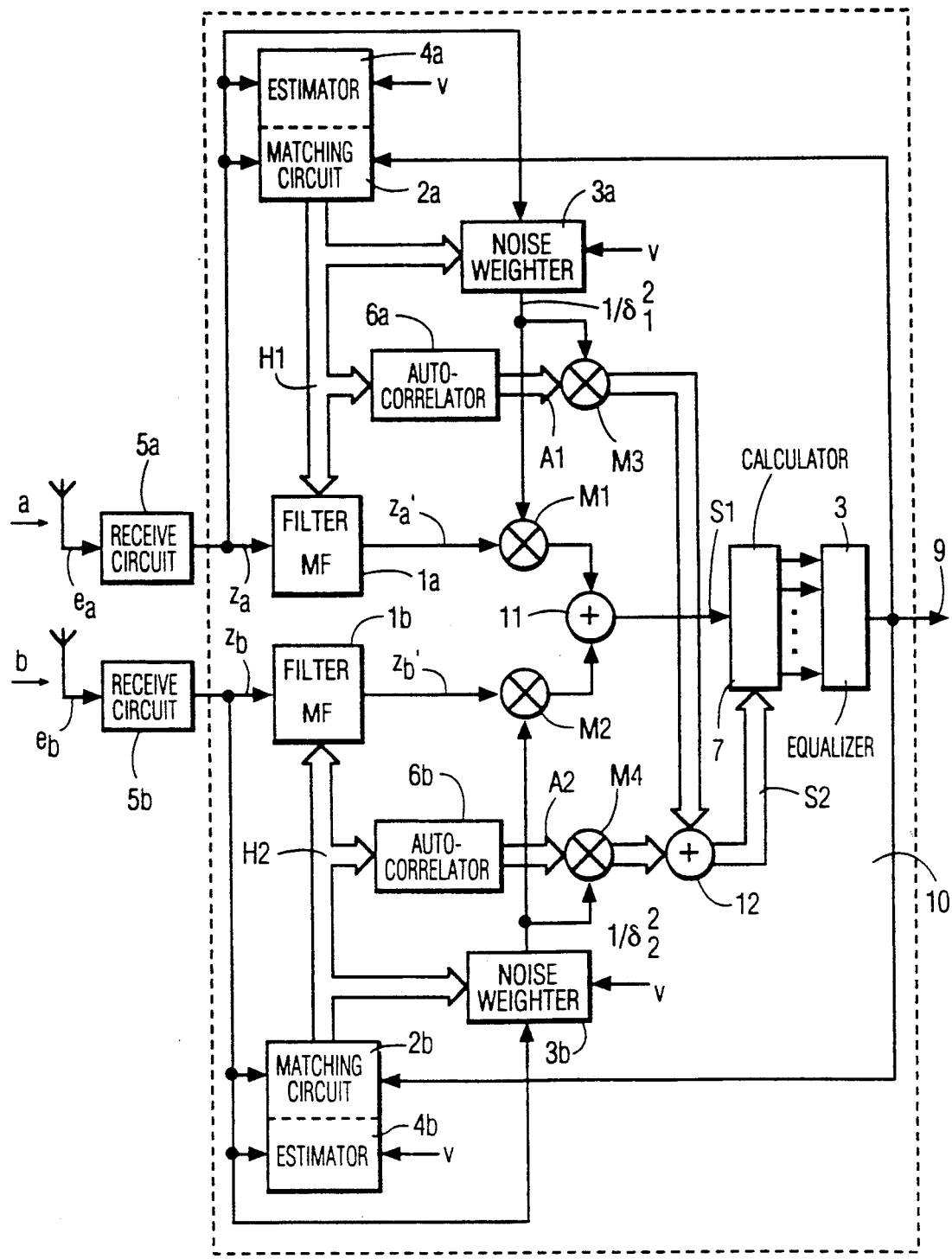
FIG. 1 shows a transmission system comprising a receiver with two receive branches.

FIG. 1 shows a diversity receiver for the GSM system, comprising two receive branches a, b. A combining arrangement 10 is provided for combining the two receive branches a, b. For this purpose, received signals $e_a$, $e_b$ are first applied to one receive circuit $5a$, $5b$ each, which comprises a HF receive section and an arrangement for producing normal and quadrature components in the baseband. At the output of the receive circuits 5a, 5b signals $z_a$, $z_b$ are available, which are applied each to an adaptive, matched filter 1a, 1b (IF) driven by estimated impulse responses H1, H2 of the receive branches a, b. Each estimated impulse response H1, H2 is formed by means of an estimation circuit 4a, 4b. For this purpose, the estimation circuits 4a, 4b are supplied with the signals $z_a$, $z_b$ as well as, for example, a comparison data sequence v stored in a memory, as is described, for example, in DE 40 01 592-A1. For example, at the beginning of a radio transmission, in a first step an estimated impulse response H1, H2 is determined with the aid of training data sequences contained in the received signals $e_a$, $e_b$ and thus also in the signals $z_a$, $z_b$ by means of a comparison with the comparison data sequence in the estimation circuits 4a, 4b. In the course of a transmission this response is then matched in further steps to the changed radio requirements. For this purpose, each estimation circuit 4a, 4b in the exemplary embodiment shown in FIG. 1 comprises a matching circuit 2a, 2b. These matching circuits are supplied with the signals $z_a$, $z_b$ as well as the output signal 9 of the combining arrangement 10. The channel impulse responses H1, H2, however, can also be estimated with the aid of the estimation circuits 4a, 4b according to a different method, especially when no training data sequences are contained in the received signals $e_a$, $e_b$.

At the output of the matched filter 1a, 1b there are two output signals $z_{a'}$, $z_{b'}$ which are applied each to a multiplier M1, M2. The multipliers M1, M2 perform a weighting of the output signals $z_{a'}$, $z_{b'}$ with the inverse proportional value of the instantaneous noise powers $\sigma_1^2$, $\sigma_2^2$ of the individual receive branches. The noise powers $\sigma_1^2$, $\sigma_2^2$, or the inverse proportional values $1/\sigma_1^2$, $1/\sigma_2^2$ of the individual receive branches a, b are produced in the respective circuits 3a, 3b from the estimated impulse responses H1, H2 from the signals $z_a$, $z_b$ and the comparison data sequence v. The output signals of the multipliers M1, M2 are added together to form a first sum S1 by means of a first adder circuit 11. The first sum S1 is applied to an arrangement 7 for calculating the metrics for an equalizer 3 following in the system, which equalizer forms the output signal 9 from the metrics. In addition, autocorrelation functions A1, A2 of the impulse responses H1, H2 of the two receive branches a, b are obtained in autocorrelation-forming circuits 6a, 6b on the basis of the estimated impulse responses H1, H2 of the two receive branches a, b. The output signals of the autocorrelation-forming circuits 6a, 6b are applied to multipliers M3, M4 which perform an evaluation with the inverse proportional value of the instantaneous noise powers $\sigma_1^2$, $\sigma_2^2$. Subsequent to these multiplications the output signals of the multipliers M3, M4 are added together by means of a second adder circuit 12 to form a second sum S2. The equalizer 3 is based on the Viterbi method whose metrics are obtained from the first and second sums S1, S2.

The signals $z_a$, $z_b$ of the receive branches a, b are actually equalized with the aid of only a single equalizer 3, so that the manufacturing costs are considerably reduced compared with a receiver that includes one equalizer in each branch. In an embodiment of the invention the estimated impulse responses H1, H2 of the individual receive branches a, b are adjusted to the transmission requirements with the aid of the matching circuits 2a, 2b at predeterminable time intervals during the equalization, so that the transmission quality is considerably improved. In addition, especially in view of reducing the manufacturing costs, the matching of the channel impulse response H1, H2 may be effected in only one predeterminable receive branch a or b. Such an adjustment of the impulse response H1, H2 is then performed in the better of the two branches a or b, because in case of diversity reception the reception quality is predominantly determined by the better receive branch a, b. By means of simulation it could be proved that there is a minimum and thus negligibly small resultant degradation even with fast changing impulse responses.

Figure 2:
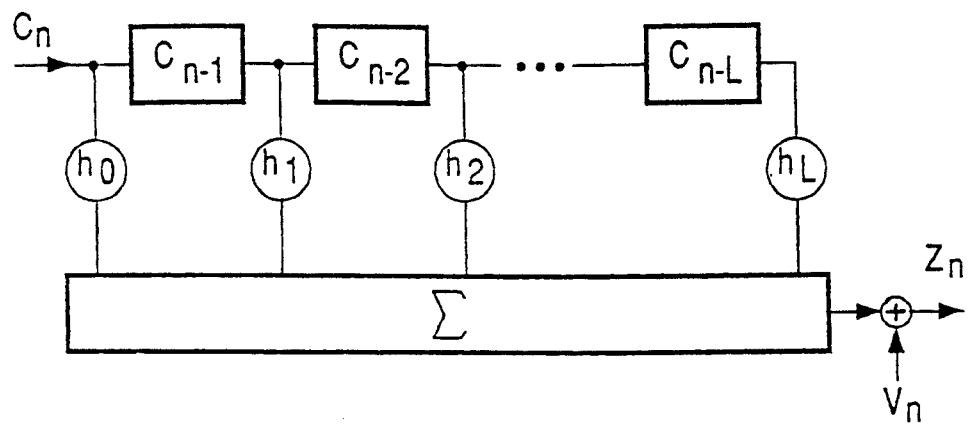
FIG. 2 shows a channel model of a transmit channel.

The channel model shown in FIG. 2 of a transmit channel is based on the idea that a sample value of a signal received at instant n linearly depends only on the bit transmitted at instant n and a finite number L of previous bits. Such a transmit channel which includes modulation, HF channel, send and receive filters as well as additive noise and sampling can be used as a basic idea for each individual receive branch. The transmission properties of the transmit channel are described by filter coefficients $h_0, \ldots, h_L$ and the statistical properties of an additively superimposed noise signal. For the transmission of a bit $b_n$ of a transversal filter and of n bits $b_{n-1}, \ldots, b_{n-L}$ preceding this bit $b_n$, a linear combination is formed so that in branch k at instant n a sample value $z_{k',n}$ is formed from $$Z_{k,n} = \sum_{l=0}^{L} c_{n-1} \cdot h_{k,l} + V_n$$

The coefficients $h_{k,0}, h_{k,1}, \ldots, h_{k,L}$ then represent sample values of the channel impulse response of the branch k. For example, a so-called training sequence comprising a bit sequence known both to the transmitter and to the receiver may be used for deriving the filter coefficients. Each time the training data sequence is received, the filter coefficients are adjusted in such a way that the output signal of the transversal filter exhibits maximum correspondence with the appropriate part of the received signal. This operation is generally denoted as channel estimation and is known, for example, from the paper by A. Bayer "Correlative and Iterative Channel-Estimation in Adaptive Viterbi Equalizers for TDMA Mobile Radio Channels", ITG Fachbericht 109, for the symposium on "Stochastische Modelle und Methoden in der Informationstechnik", April 1989, published in VDE Fachbericht 107, VDE Verlag, Berlin, pp. 363 to 368. The paper also provides further references to the literature.

The noise signal Vn is generally characterized by the variance $\sigma^2$ (noise power). For this purpose, there is, for example, an estimate $\sigma^2$ for the variance in each receive branch a, b. In GSM receivers this estimate may be formed in each time slot, for example, with the aid of the estimated impulse response and the training sequence, as is described, for example, in German Patent Application P 40 01 592.0 (date of filing Jan. 20, 1990).

Figure 3:
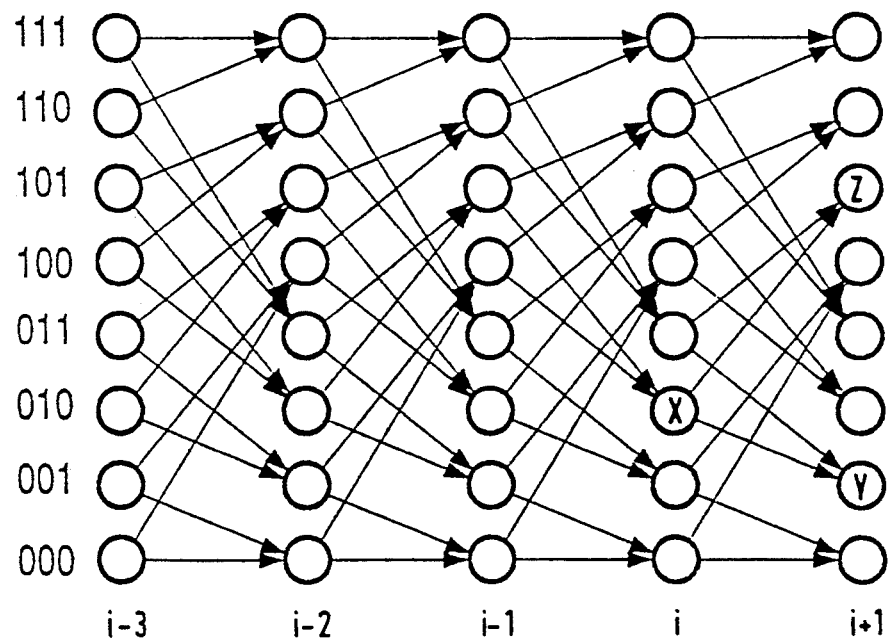
FIG. 3 to FIG. 5 show state diagrams for an equalizer.
Figure 4:
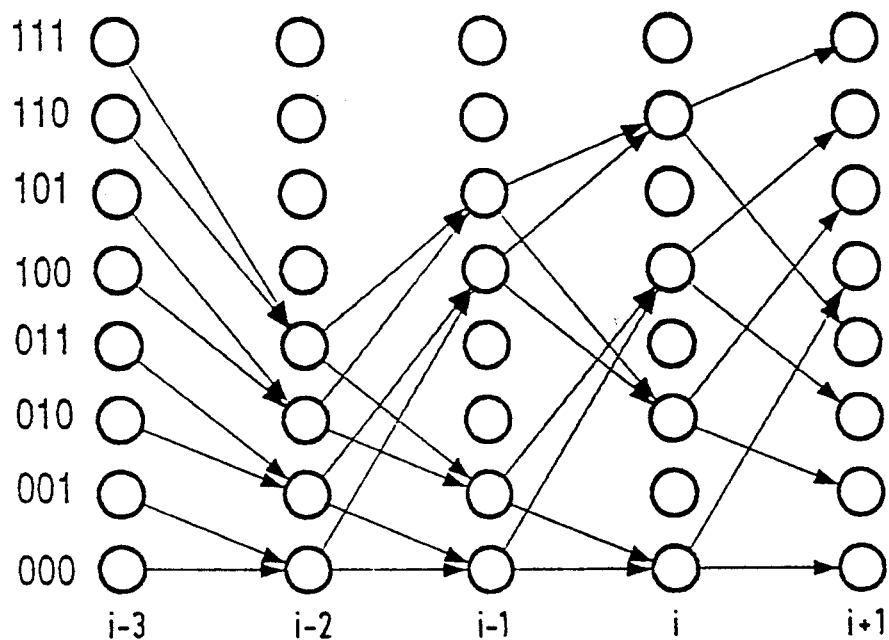
Figure 5:
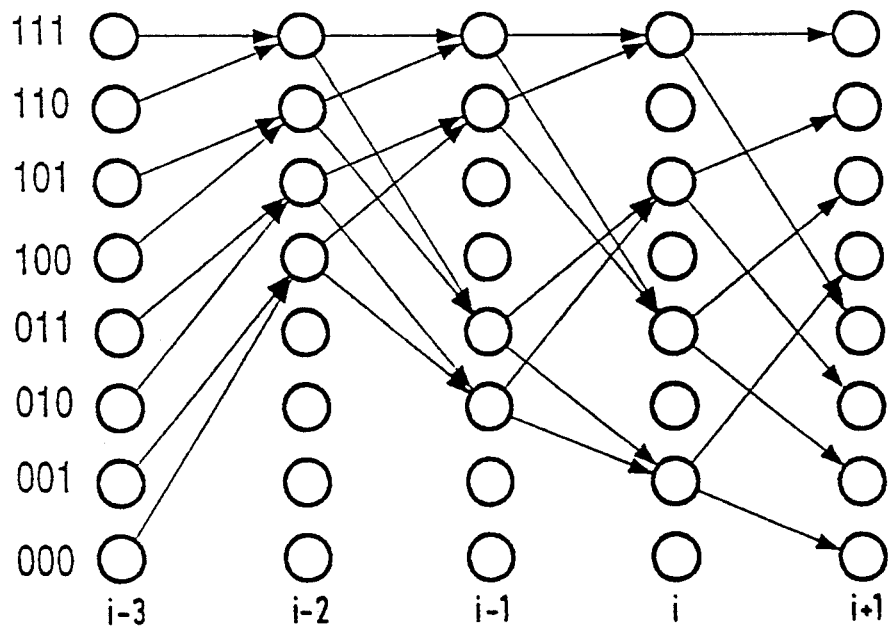

FIG. 3 shows a state diagram for an equalizer based on the Viterbi method. For describing this method one generally uses a state diagram shown as a graph with columns of $2^L$ nodes. In the state diagram represented in FIG. 3, L was chosen to be equal to 3. Each node represents one of the combinations to be made from one bit. L is then the number of bits preceding a just transmitted bit, whose influence on the bit to be estimated is to be taken into account for the equalization and corresponds to the number of memory elements of the channel model shown in FIG. 2. Each combination of these bits is denoted a state in the following. The state diagram shows a plurality of rows in horizontal direction. Each column is assigned to a specific sampling instant i-31 3, i−2, i−1, i, i+1. The individual binary values (in FIG. 3 000 . . . 111) which can be assigned to a node are referenced the state of the node.

In the state diagram the same state is always assigned to a node in the row, while the sequences of binary values assigned to these states are represented in such a way that the binary value shown to the left is assigned to the bit transmitted most recently, the next binary value is assigned to the bit transmitted most recently but one etc. The state immediately prior to this transmission of the binary value $b_i$ is then defined by the bit sequence $b_{i-1}, b_{i-2} \ldots b_{i-L}$.

When a new sample value $z_i$ is received, both the binary value 0 and the binary value 1 may be assigned to the bit transmitted at instant i. For example, when a binary value $b_i=0$ is taken, the bit sequence 010 becomes 0010 and 1010 when a binary value $b_i=1$ is taken, which sequence may be assigned to the transition to the next state. From the state 010 the states 001 and 101 respectively, are thus arrived at. From each state there are always only two transitions to states in the state column to the right of the original state column due to the two values the new bit may take.

In the state diagram shown in FIG. 3 all transitions possible in this manner are denoted by arrows. For example, the two arrows from node x, whose state is assigned to the bit sequence 010 at instant i, show, on the one hand, a zero-transition to the node y to which the state 001 is assigned at instant i+1 and, on the other hand, a one-transition to the node z to which the state 101 is assigned at instant i+1.

For each transition from one node to the next node the probability is estimated with which this transition has effected. A path is obtained by stringing together coherent transitions between nodes of adjacent node columns. This path has the same meaning as the reconstructed binary sequence $b_i, b_{i-1}, \ldots, b_{i-L}$. By multiplicatively combining the probabilities of the individual transitions of a path the overall probability of the path is determined.

For calculating the probability of a transition from one state to another state, the individual binary values of the bits $b_i, \ldots, b_{i-L}$ of a state are used as input parameters $c_i, \ldots, c_L$ of the transversal filter as shown in FIG. 2. The first input parameter $c_i$ always defines the transition from the previous state to the next state and the next input parameter $b_{i-1}, \ldots, b_{i-L}$ define the delayed state $S_{i-1}$. The output value of the transversal filter approximately presents at instant i the value of z, which value should assume the sample value of the undisturbed received signal if the bit sequence $b_i, b_{i-1}, \ldots, b_{i-L}$ used as input parameters had been transmitted and received over the radio transmission link. By comparing the output value $z_i$ with the real sample value $z_i$ of the received signal the most probably transmitted sequence $b_i, \ldots, b_{i-L}$ could thus already be found.

A great transition probability from one state to a time-consecutive state certainly does not give sufficient guarantee that this transition is correct. Brief disturbances or signal noise may accidentally cause a state transition that has not actually taken place to appear as the most probable transition. More correct estimates for the state transitions and thus the estimate of the binary value of the just received digital sample value are obtained by taking the overall signal behaviour thus far into consideration in that a cumulative probability is considered for all the state transitions which lead to one of the $2^L$ states of the considered instant. For this purpose, an overall probability parameter may be assigned to each state which parameter is formed in a manner similarly used for forming the overall probability by multiplicatively combining all the individual probability parameters of the individual state transitions that led to this state.

So-called metrics can be used instead of the probability parameters. The metric can be calculated from the negative logarithm of each probability parameter. This is advantageous, for example, in that the metrics are only to be added together to obtain an overall probability, whereas the individual probability parameters are to be multiplied.

Thereby, metrics or so-called metric increments can be determined for each possible state transition $2^{L+1}$. For each next state a new metric is determined.

A basis for the invention is the calculation of the metric increments in accordance with the equation:

$$\lambda(S_{n-1}, S_n) = -Re\left\{ c_n\left( Y_n - \sum_{l=1}^{L} c_{n-1} \rho_l \right) \right\},$$

with $c_n = 1 - 2b_n$

In this equation the bits $b_{n-1}$ and $b_n$ denote the transition from a state $S_{n-1}$ to a state $S_n$. $y_n$ describes the first sum and $\rho_l$ the second sum, whereas n denotes a sampling instant and 1 a finite number of previous bits. Then, $y_n$ is obtained from the weighted addition of the matched filter 1a, 1b (FIG. 1) and 1 for l=0, 1 . . . , L from the weighted addition of the autocorrelation functions of the estimated channel impulse response of each receive branch. Expressed mathematically, one obtains $y_n$ with K receive branches from $$Y_n = \sum_{k=1}^{K} \frac{Y_{k,n}}{\sigma_k^2} \text{ with } Y_{k,n} = \sum_{l=0}^{L} Z_{k,n+l} h_{k,l}^*$$

wherein:
$\sigma_k^2$ denotes the estimated noise signal power in branch k, $h_{k'0}, h_{k'1}, \ldots, h_{k'L}$ the estimated coefficients of the channel model shown in FIG. 2 for the branch k (the upper case asterisk denotes that the conjugate complex values are to be used here), $z_{k'1}, z_{k'2}, \ldots, z_{k'N}$ denotes the sample values of the signal received for the duration of a time slot in the branch k. The values represent the baseband equivalent of the received signal.

Furthermore, $$\rho_l = \sum_{k=1}^{K} \frac{\tau_{k,l}}{\sigma_k^2} \text{ with } \rho_{k,l} = \sum_{i=0}^{L-1} h_{k,i+l} h_{k,i}^*$$

The last two equations are to be calculated only when the channel impulse response is changed. This is generally not the case with a state transition (trellis step). In a receiver manufactured for the GSM system this is necessary, for example, only every tenth trellis step.

The actual equalization with the Viterbi method is collectively effected for all the receive branches. For example, with a receiver comprising two receive branches it is possible to perform the so-called maximum ratio combination for two receive branches in a single processor of the DSP 16A type by AT&T, whereas two processors of this type used to be necessary for this purpose.

The proposed receiver is suitable, for example, for the GSM system in which GMSK modulation is used. The proposed method may furthermore be used always in cases where the overall transmit path of the digital data to be transmitted, which data may certainly comprise redundancy bits for error correction and/or synchronization purposes, represents a linear system up to the receiver input or may be described at least approximately by a linear system. The proposed method, however, is not restricted to systems with a time slot structure as is the case, for example, in the GSM system.

I claim:

1. A receiver comprising at least two receive branches (a, b) for receiving transmitted signals affected by different transmission characteristics, each said branch comprising a respective receive circuit (5a, 5b), and a combining arrangement (10) for combining the receive branches (a, b), characterized in that each receive branch (a,b) comprises a matched filter (1a, 1b) having a respective output signal and an arrangement (6a, 6b) for forming an estimated impulse response (H1, H2) for that branch and an appropriate autocorrelation function (A1, A2) for the estimated impulse response (H1, H2) of that receive branch (a,b), and in that the combining arrangement (10) comprises means for weighting the matched filter output signals ($z_a$, $z_b$) with respective first weight factors, means for weighting the autocorrelation functions ($z_a$, $z_b$) with respective second weight factors, a first adder circuit (11) for adding together the matched filter output signals ($z_a$, $z_b$) which have been weighted with said first weight factors to form a first sum (S1), a second adder circuit (12) for adding together the receive branch autocorrelation functions (A1, A2) weighted with the second weight factors to form a second sum (S2), and an equalizer (3,7) for evaluating the first and second sums (S1, S2), the respective weight factors being approximately inversely proportional to an instantaneous noise power ($\sigma_1^2$, $\sigma_2^2$) in each receive branch (a,b).

2. A receiver as claimed in claim 1, characterized in that the equalizer (3, 7) comprises an evaluation arrangement (7) for evaluating the first and second sums (S1, S2), while metrics for the equalizer (3, 7) which is specifically based on the Viterbi method can be produced from the first and second sums (S1, S2) in the evaluation arrangement (7).

3. A receiver as claimed in claim 2, characterized in that in at least one receive branch (a,b) said combining arrangement comprises matching means (2a, 2b) for matching the estimated impulse response (H1, H2) at predeterminable intervals to the transmission characteristics.

4. A receiver as claimed in claim 3, further comprising means for estimating maximum ratio combining for said receive branches, characterized in that the matching means (2a, 2b) match the estimated impulse response (H1, H2) only in the receive branch (a,b) that has the larger estimated maximum ratio combining.

5. A receiver as claimed in claim 4, characterized in that the metrics are formed in accordance with the following equation:

$$\lambda(S_{n-1}, S_n) = -Re\left\{ c_n\left( Y_n - \sum_{l=1}^{L} c_{n-l}\, p_l \right) \right\},$$

with $c_n = 1 - 2b_n$ where the bits $b_{n-L} \ldots b_n$ denote the transition of a state $S_{n-1}=(b_{n-L} \ldots b_{n-1})$ to a state $S_n=(b_{n-L+1}, \ldots b_n)$ denotes the first sum (S1) and $p_l$ denotes the second sum (S2), n denotes a sampling instant and 1 denotes a finite number of previous bits.

6. A receiver as claimed in claim 5, characterized in that the receiver (5a, 5b, 10) comprises an estimation circuit (4a, 4b) for determining the estimated impulse responses (H1, H2), while the estimated impulse response (H1, H2) of each receive branch (a, b) may individually be estimated on the basis of a comparison data sequence (v) stored in the receiver and a training data sequence contained in a transmitted data sequence.

7. A receiver as claimed in claim 5, characterized in that the transmitted data sequence comprises a training data sequence from which the impulse response of the ratio transmission link in each receive branch (a, b) is individually estimated with the aid of a comparison data sequence stored in the receiver.

8. A receiver as claimed in claim 1, characterized in that the transmitted data sequence comprises a training data sequence from which the impulse response of the radio transmission link in each receive branch (a, b) is individually estimated with the aid of a comparison data sequence stored in the receiver.

9. A receiver as claimed in claim 1, characterized in that the receiver (5a, 5b, 10) comprises an estimation circuit (4a, 4b) for determining the estimated impulse responses (H1, H2), while the estimated impulse response (H1, H2) of each receive branch (a, b) may individually be estimated on the basis of a comparison data sequence (v) stored in the receiver and a training data sequence contained in a transmitted data sequence.

10. A receiver as claimed in claim 1, characterized in that in at least one receive branch (a,b) said combining arrangement comprises matching means (2a, 2b) for matching the estimated impulse response (H1, H2) at predeterminable intervals to the transmission characteristics.

11. A receiver as claimed in claim 10, comprising means for estimating maximum ratio combining for said receive branches, characterized in that the matching means (2a, 2b) match the estimated impulse response (H1, H2) only in the receive branch (a,b) that has the larger estimated maximum ratio combining.

12. A receiver as claimed in claim 11, characterized in that the receiver (5a, 5b, 10) comprises an estimation circuit (4a, 4b) for determining the estimated impulse responses (H1, H2) while the estimated impulse response (H1, H2) of each receive branch (a, b) may individually be estimated on the basis of a comparison data sequence (v) stored in the receiver and a training data sequence contained in a transmitted data sequence.

13. A receiver as claimed in claim 1, characterized in that the metrics are formed in accordance with the following equation:

$$\lambda(S_{n-1}, S_n) = -Re\left\{ c_n \left( Y_n - \sum_{l=1}^{L} c_{n-l} \rho_l \right) \right\},$$

with $c_n = 1 - 2b_n$ where the bits $b_{n-L} \ldots b_n$ denote the transition of a state $S_{n-1} = (b_{n-L} \ldots b_{n-1})$ to a state $S_n = (b_{n-L+1}, \ldots b_n)$, $Y_n$ denotes the first sum (S1) and $\rho_l$ denotes the second sum (S2), n denotes a sampling instant and 1 denotes a finite number of previous bits.

14. A receiver as claimed in claim 13, characterized in that the receiver (5a, 5b, 10) comprises an estimation circuit (4a, 4b) for determining the estimated impulse responses (H1, H2), while the estimated impulse response (H1, H2) of each receive branch (a, b) may individually be estimated on the basis of a comparison data sequence (v) stored in the receiver and a training data sequence contained in a transmitted data sequence.

* * * * *